United States Patent [19]

Chesler et al.

[11] Patent Number: 5,042,906

[45] Date of Patent: Aug. 27, 1991

[54] DISPERSION EQUALIZED OPTICAL FIBER LINK

[75] Inventors: Ronald B. Chesler, Woodland Hills; Hui-Pin Hsu, Northridge, both of Calif.

[73] Assignee: Hughes Aircraft Company, Los Angeles, Calif.

[21] Appl. No.: 548,048

[22] Filed: Jul. 5, 1990

[51] Int. Cl.⁵ ............................................. G02B 6/16
[52] U.S. Cl. ..................................... 385/123; 385/27
[58] Field of Search ................ 350/96.30, 96.11, 96.15

[56] References Cited

U.S. PATENT DOCUMENTS

| | | | |
|---|---|---|---|
| 4,655,547 | 4/1987 | Heritage et al. | 350/96.11 X |
| 4,741,587 | 5/1988 | Jewell et al. | 350/96.15 X |
| 4,747,655 | 5/1988 | Shirasaki | 350/96.16 X |
| 4,750,802 | 6/1988 | Bhagavatula | 350/96.15 |
| 4,768,853 | 9/1988 | Bhagavatula | 350/96.15 |
| 4,969,710 | 11/1990 | Tick et al. | 350/96.30 |

OTHER PUBLICATIONS

Chinlon Lin et al., "Optical-Pulse Equalization of Low-Dispersion Transmission in Single-Mode Fibers in the 1.3–1.7-μm Spectral Region", Optical Society of America, pp. 476–478, 1980.

*Primary Examiner*—John D. Lee
*Assistant Examiner*—Phan T. Heartney
*Attorney, Agent, or Firm*—C. D. Brown; R. M. Heald; W. K. Denson-Low

[57] ABSTRACT

A dispersion equalization technique for correcting dispersion-induced signal degradation within optical fibers is disclosed herein. The present invention prescribes a technique for synthesizing an optical fiber R of length L adapted to induce substantially zero dispersion at a wavelength W' included between first and second wavelengths W1 and W2. The optical fiber R includes first and second segments M and C of variable lengths $L_1$ and $L_2$ which induce substantially zero dispersion at the wavelengths W1 and W2, respectively.

6 Claims, 3 Drawing Sheets

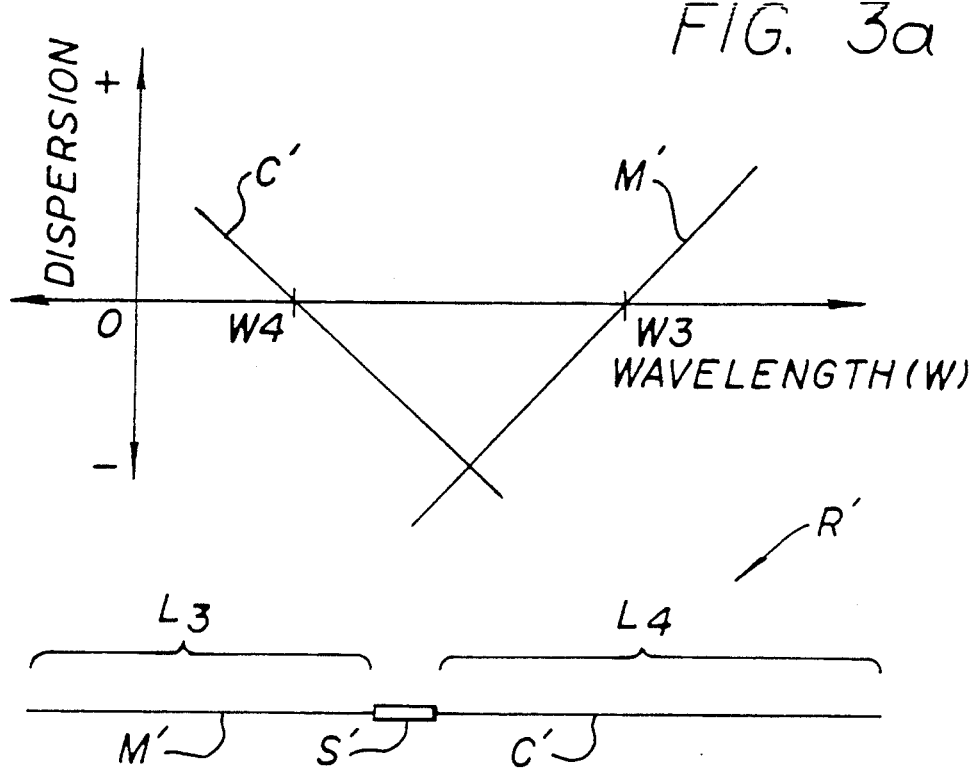
FIG. 3a
FIG. 3b
FIG. 4a
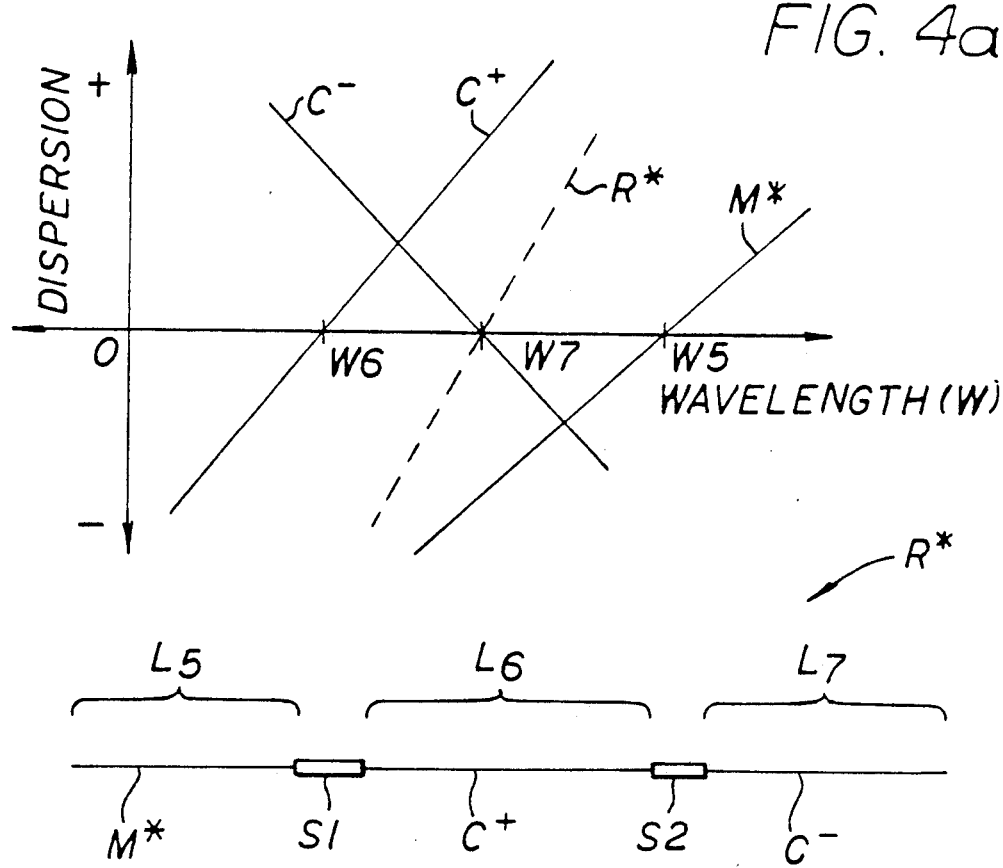
FIG. 4b 5,042,906

DISPERSION EQUALIZED OPTICAL FIBER LINK

BACKGROUND OF THE INVENTION

1. Field of the Invention

This invention relates to fiber-optic communication systems. More specifically, this invention relates to signal dispersion induced by optical fibers within such communication systems.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

The transmission range of an optical fiber in a communication system is principally limited by two factors. First, optical loss may attenuate the signal carried by the optical fiber below the sensitivity of signal detection apparatus positioned at an end of the fiber. Second, dispersion (wherein the various spectral components of a signal propagate at different rates through the fiber) may degrade the signal waveform such that it becomes imperceptible after having traversed a certain length of optical fiber.

FIG. 1 illustratively represents the effect of dispersion on a series of pulses P1 through P5 launched into a conventional optical fiber. As shown in FIG. 1, the shape of pulse P2 is intact after traversing a relatively short distance d1. However, the pulses P3 and P4 are smeared out and overlap after having traveled a distance d2. In particular, at distance d2 certain faster traveling wavelength components of pulse P3 have overtaken the relatively slower traveling wavelength components of pulse P4. When an analog signal is transmitted through the fiber, dispersion may be manifested in phase and amplitude distortions of the signal. It is a general objective of the present invention to correct for this type of dispersion-induced signal degradation.

Many commercially available optical fibers have a "zero dispersion wavelength" (i.e. the optical wavelength at which dispersion induced by the fiber is substantially zero) in the vicinity of 1550 nm for silica-based optical fibers. However, in conventional optical fiber communication systems the operative wavelength of the driving laser typically does not exactly coincide with the zero dispersion wavelength of the fiber. This lack of wavelength identity may be occasioned by an inability to adequately control the manufacturing process, temperature fluctuation or age-induced drift of the laser wavelength. Whatever the cause, this lack of identify often results in distortion of the signal carried by the fiber.

A further difficulty arises from the fact that an optical signal transmitted via an optical fiber typically includes a spectrum of frequencies. Hence, even in a system wherein dispersion was made to be close to zero near the wavelength spectrum of minimum loss, spectral components of the optical signal, not precisely coincident with the zero dispersion wavelength, would have differing propagation delays through the fiber—thereby leading to signal distortion. Accordingly, it is a further object of the present invention to provide an optical fiber exhibiting substantially zero dispersion across a spectrum of wavelengths wherein signal loss is also minimal.

A method of realizing a composite fiber link by concatenating two fiber sections of differing positive dispersion slope characteristics is discussed by D. Marcuse and C. Lin in "Low Dispersion Single-Mode Fiber Transmission—The Question of Practical versus Theoretical Maximum Transmission Bandwidth", *IEEE J. O. El.* QE-17, pp. 869–78, 1981. The method disclosed allows the zero dispersion wavelength of the composite fiber to be selected to lie between the zero dispersion wavelengths of the component fibers, and includes the procedure of adjusting the lengths of the component fibers. While the method of Marcuse, et. al can assist in alleviating the gross mismatch between the operating wavelength of a light source and the zero dispersion wavelength of a fiber optically coupled thereto, it does not address the problem of mismatches engendered by age and temperature induced drift of the light source wavelength. It follows that a need in the art exists for minimizing fiber dispersion about a range of wavelengths encompassing the operative light source wavelength.

SUMMARY OF THE INVENTION

The need in the art to correct for dispersion-induced signal degradation within optical fibers over a range of wavelengths is addressed by the dispersion equalization technique of the present invention.

The present invention prescribes a technique for synthesizing an optical fiber of length L adapted to induce substantially zero dispersion at a wavelength W" included between first and second wavelengths W1 and W2. The optical fiber includes first and second segments of variable lengths L1 and L2 which induce substantially zero dispersion at the wavelengths W1 and W2. The first and second segments have first-order dispersion characteristics $D_1$ and $D_2$ as functions of wavelength W, where $$D_1 = M_1(W - W1)L_1, \text{ and}$$

$$D_2 = M_2(W - W2)L_2.$$

wherein $M_1$ and $M_2$ are positive constants. The dispersion equalization technique of the present invention includes the step of adjusting the length $L_1$ of the first segment such that $$L_1 = \frac{L(2M_2(W2 - W^*))}{2(M_2 - M_1)W1 - (M_1 - M_2)(W2 - W1)}.$$

Next, the length $L_2$ of the second segment is adjusted such that $L_2 = L - L_1$.

The present invention also prescribes a technique for synthesizing an optical fiber of length L having a dispersion characteristic substantially equal to zero over a first range of wavelengths. The fiber includes first and second segments of variable lengths $L_1$ and $L_2$. The first and second segments have a zero dispersion wavelength of W1 and first order dispersion characteristics $D_1$ and $D_2$ as functions of wavelength W, where $$D_1 = M_1(W - W1)L_1, \text{ and}$$

$$D_2 = M_2(W - W1)L_2$$

over the first wavelength range and where $M_1$ and $M_2$ are positive constants. It is thus apparent that the second segment D2 has a negative dispersion slope. Next, the length $L_1$ of the first segment is adjusted such that $L_1 = L(M_2/M_1)/(1+M_2/M_1)$. The length $L_2$ of the second segment is then adjusted in order that $L_2 = L - L_1$.

In certain applications fiber sections having substantially equivalent zero dispersion wavelengths may be unavailable. This presents a difficulty which is addressed by the tri-section dispersion compensation technique of the present invention. In the tri-section compensation technique, two fiber sections having the same sign of dispersion slope are concatenated to produce a composite section. The composite section has a zero dispersion wavelength substantially identical to that of a third fiber section. The slope of the dispersion characteristics of the composite fiber section and the third fiber section are of opposite sign. The composite and third fiber sections may then be concatenated in accordance with the teachings of the two compensation techniques described above. The resultant three-section composite fiber has a dispersion characteristic which, to a first order, is substantially equivalent to zero about a desired wavelength.

BRIEF DESCRIPTION OF THE DRAWINGS

FIG. 3a is a graph depicting a set of first order dispersion characteristics which illustrate a scheme for minimizing dispersion over a spectrum of wavelengths encompassing the desired operational wavelength of an optical fiber.

FIG. 3b is a schematic representation of a compensated fiber link R' of the present invention.

FIG. 4a graphically depicts the dispersion characteristics M*, C− and C− of a main fiber, and of positive and negative slope correcting fibers fabricated in accordance with a tri-section fiber compensation technique of the present invention.

FIG. 4b is a schematic representation of a tri-sectional compensated fiber R* of the present invention.

DETAILED DESCRIPTION OF THE INVENTION

Figure 1:
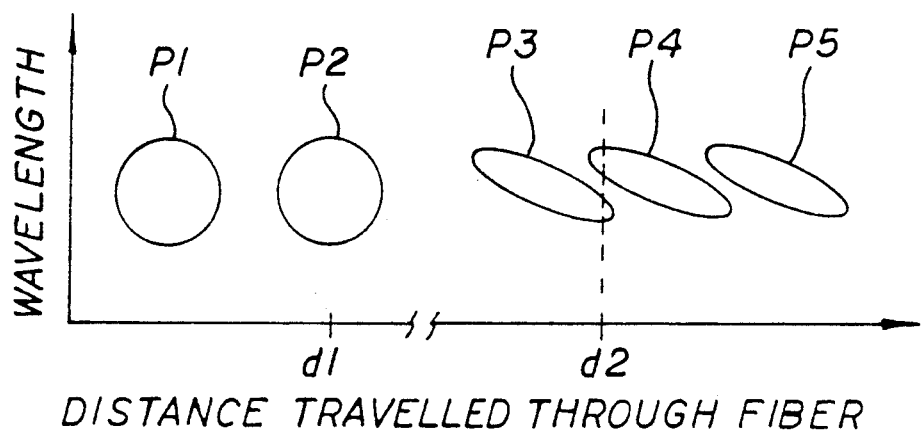
FIG. 1 illustratively represents the effect of dispersion on a series of pulses P1 through P5 launched into a conventional optical fiber.
Figure 2A:
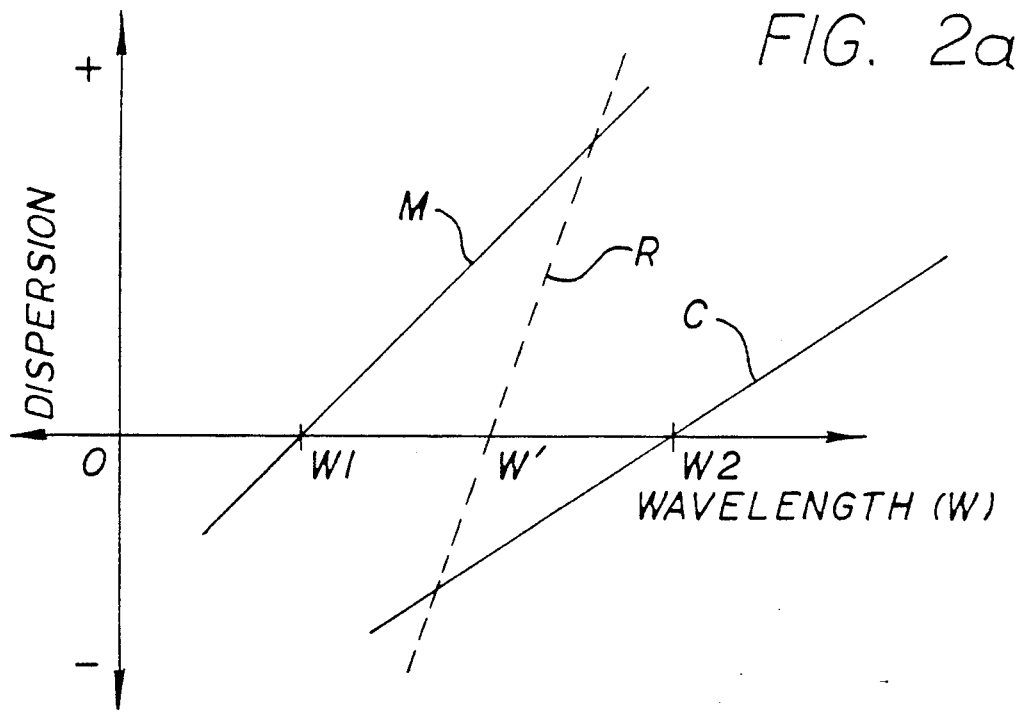
FIG. 2a is a graph depicting the first order dispersion characteristics of several optical fibers concatenated in accordance with a preferred embodiment of the dispersion equalization technique of the present invention.
Figure 2B:
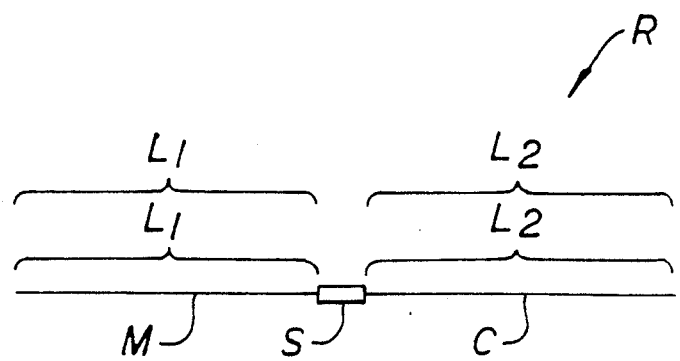
FIG. 2b is a schematic representation of a compensated fiber link R of the present invention.

FIG. 2a is a graph depicting the first order dispersion characteristics of several optical fibers selected in accordance with the teachings of the dispersion equalization technique of the present invention. The lines denoted by M, C, and R correspond to the dispersion characteristics of a main optical fiber link M, a correcting fiber C, and a compensated fiber link R. As shown in the schematic representation of FIG. 2b, the link R is synthesized by concatenating the main fiber M and correcting fiber C through a conventional fiber splice S. As shown in FIG. 2a, the zero dispersion wavelengths of the main optical fiber link M, correcting fiber C and compensated link R are W1, W2 and W', respectively. As is discussed more fully below, the dispersion equalization technique of the present invention allows adjustment of the zero dispersion wavelength W' between wavelengths W1 and W2 by appropriately selecting the lengths of the main (M) and correcting (C) optical fibers. In this manner a fiber link having a zero dispersion wavelength of a desired value may be synthesized.

The dispersion characteristics M and C of the main and correcting fibers depend on the lengths $L_1$ and $L_2$ thereof (see FIG. 2b) to a first order in accordance with the following expressions:

$$M = M_1(W' - W1)L_1 \quad [1]$$

and $$C = M_2(W' - W2)L_2 \quad [2]$$

wherein $M_1$ and $M_2$ are positive constants and W denotes the operative wavelength. The dispersion characteristic of the compensated fiber R (which, again, is formed by concatenating the main and correcting fibers such that the compensated fiber has a length $L = L_1 + L_2$) is obtained by adding equations [1] and [2] as follows:

$$R = M - C = (M_1 L_1 - M_2 L_2)W' - (M_1 L_1 W1 - M_2 L_2 W2) \quad [3]$$

To achieve zero dispersion within the compensated fiber at the wavelength W' (see FIG. 2a), equation [3] is set to zero and the relative lengths of the fibers $L_1$ and $L_2$ are therefore given by:

$$L_1 = \frac{L(2M_2(W2 - W'))}{2(M_2 - M_1)W1 - (M_1 - M_2)(W2 - W'))} \quad [4]$$

and $$L_2 = L - L_1. \quad [5]$$

Equations [4] and [5] thus allow determination of the lengths $L_1$ and $L_2$ of the main and correcting fibers in terms of the desired composite fiber length L and operation wavelength W'. Accordingly, the present invention enables adjustment of the fiber zero dispersion wavelength by prescribing relative values of the lengths $L_1$ and $L_2$.

As was mentioned in the Background of the Invention, information is typically transmitted along the fiber by modulating the optical carrier about the operative wavelength. However, the operative laser wavelength tends to drift with age and variation in temperature. This suggests that it would be desirable to minimize dispersion not only at the operative wavelength, but also throughout a wavelength spectrum encompassing the operative wavelength.

FIG. 3a depicts a set of first order dispersion characteristics which illustrate a scheme for minimizing dispersion over just such a wavelength spectrum. As shown in FIG. 3a, a main fiber M' has a zero dispersion wavelength W3 while a correcting fiber C' has a zero dispersion wavelength W4 and a "negative" dispersion slope. (This is commonly found in the type of fibers known in the art as "dispersion flattened" fibers.) As shown in FIG. 3b, the main (M') and correcting (C') fibers are concatenated by a conventional fiber splice S', and their respective lengths $L_3$ and $L_4$ adjusted in order to synthesize a compensated fiber R' having a dispersion characteristic (not shown) of substantially zero.

The first order dispersion characteristics corresponding to the main (M') and correcting (C') fibers may be represented as:

$$M' = M_3(W - W3)L_3 \quad [6]$$

$$C' = -M_4(W - W4)L_4 \quad [7]$$

where $M_3$ and $M_4$ are positive constants and W denotes wavelengths. By adding equations [6] and [7] the dispersion characteristic corresponding to the concatenated, compensated fiber (R') is found to be:

$$R' = M' + C' = M_3(W - W3)L_3 - M_4(W - W4)L_4 \quad [8]$$

The dispersion characteristic for the fiber R' is made to be substantially zero for wavelengths W over which equations [6] and [7] are valid by first choosing main and correcting fibers having identical zero dispersion wavelengths (W3=W4). Next, the lengths $L_3$ and $L_4$ are adjusted such that $M_3L_3 = M_4L_4$, or equivalently such that:

$$L_3 = L(M_4/M_3)/(1 - M_4/M_3) \quad [9]$$

and $$L_4 = L - L_3 \quad [10]$$

where L is the length of the compensated fiber and $L = L_4 + L_3$. Hence, the teachings of the present invention may be utilized to minimize dispersion over a range of wavelengths rather than merely at a single wavelength. Moreover, since dispersion is made to be substantially zero over a range of wavelengths, fluctuations in the wavelength of the optical source will not necessarily engender increased dispersion. Higher order dispersion effects may be partially ameliorated by modifying the above segment lengths to minimize the total dispersion.

As noted above, in order to obtain a substantially dispersion free band of wavelengths using a pair of fibers of opposite slope, it is necessary that the zero dispersion wavelengths of the two fibers be essentially equal. This constraint may be overcome by introducing a third fiber section. Briefly, this technique uses two fiber sections having dispersion characteristics with slopes of the same polarity and a third section with a dispersion slope of opposite polarity. The fibers of like slope are chosen such that their combined zero dispersion wavelength coincides with that of the third fiber of opposite dispersion slope.

FIG. 4a depicts the dispersion characteristics of a main fiber, and of positive and negative slope correcting fibers M*, C+ and C− utilized in the tri-section fiber compensation technique summarized above. As shown in FIG. 4a, the respective zero dispersion wavelengths of the main fiber, and of the positive and negative slope fibers are denoted by W5, W6 and W7. The first order dispersion characteristics of the fibers M*, C+ and C− are given by:

$$M^* = M_5(W - W5)L_5 \quad [11]$$

$$C^+ = M_6(W - W6)L_6 \quad [12]$$

$$C^- = -M_7(W - W7)L_7 \quad [13]$$

wherein $L_5$, $L_6$ and $L_7$ denote the lengths of the main, positive slope, and negative slope fibers and W denotes wavelength. Further, $M_5$, $M_6$ and $M_7$ are positive constants. FIG. 4b is a schematic representation of a concatenated fiber R* which includes the fibers M*, C+ and C− conventionally joined via fiber splices S1 and S2. As a first step, the lengths $L_5$ and $L_6$ of the main fiber and of the positive slope correcting fiber are chosen such that their combined zero dispersion wavelength subsequent to concatenation is equivalent to W7. The dispersion characteristic of the fiber R* is shown in FIG. 4a. A relationship between $L_5$ and $L_6$ stemming from this first requirement is obtained by setting the sum of equations [11] and [12] equal to zero at W=W7. Next, an expression relating $L_7$ to $L_5$ and $L_6$ is obtained by equating the sum of equations [11], [12] and [13] to zero. The above algebraic manipulations result in the following set of equations:

$$L_5M_5 - L_6M_6 - L_7M_7 = 0 \quad [14]$$

$$L_5M_5W_5 - L_6M_6W_6 - L_7M_7W_7 = 0 \quad [15]$$

A third equation is obtained by observing that the length L* of the resultant three fiber compensated link is given by:

$$L^* = L_5 + L_6 + L_7 \quad [16]$$

Solving equations (14), (15) and (16) yields the fiber lengths $L_5$, $L_6$ and $L_7$ relative to the total fiber length L*:

$$L_5 = (L^*/D)(M_6M_7(W6 - W7)) \quad [17]$$

$$L_6 = (L^*/D)(M_5M_7(W7 - W5)) \quad [18]$$

$$L_7 = (L^*/D)(M_5M_6(W6 - W5)) \quad [19]$$

where
$D = M_5M_6(W6 - W5) - M_5M_7(W7 - W5) - M_6M_7(W6 - W7)$. Thus, the tri-sectional dispersion equalization technique of the present invention obviates the need to precisely match the zero dispersion wavelength of a single fiber having a positively sloped dispersion characteristic with that of a fiber having a negatively sloped characteristic in order to create a composite fiber substantially free of dispersion over a particular wavelength spectrum. In particular, the main (M*) and correcting (C−) positively sloped fibers need only be chosen such that their zero dispersion wavelengths W5 and W7 straddle the zero dispersion wavelength W7 of the negatively sloped (C−) correcting fiber. (In the above, the roles of positive and negative can be interchanged.) In this manner the tri-sectional compensation technique overcomes design constraints imposed by the imprecision in, and the limited degree of choice afforded by, the set of zero dispersion wavelengths associated with commercially available optical fibers.

Figure 5:
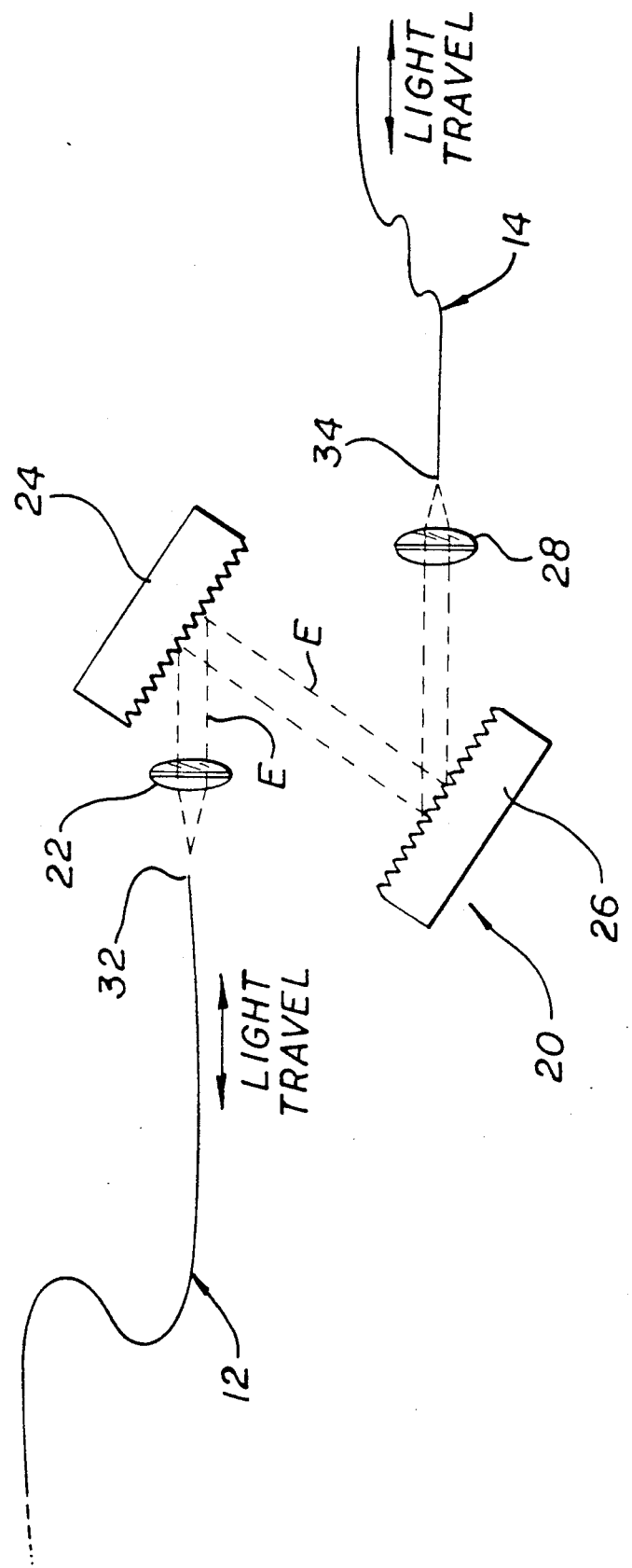
FIG. 5 is an illustrative representation of an alternative embodiment of the dispersion equalized optical fiber link of the present invention.

FIG. 5 is an illustrative representation of an alternative embodiment of a section of the dispersion equalized optical fiber link 10 of the present invention. The link 10 includes first and second optical fibers 12, 14. The first and second fibers 12, 14 are mutually optically coupled via an optical grating arrangement 20. The grating arrangement 20 includes a first lens 22, a first grating member 24, a second grating member 26 and a second lens 28. Optical energy E from the first fiber 12 passes through a lens (not shown) which terminates the fiber 12 at a first end 32 thereof. The energy E next impinges on the lens 22, which focuses it upon the first grating member 24. The energy E is reflected by the first member 24 to the second member 26. The second member 26 then reflects the optical energy E to the lens 28, which focuses the energy E upon the second fiber segment 14. The energy E enters the fiber 14 through a lens (not shown) which terminates a first end 34 thereof.

The optical grating arrangement 20 is of conventional design, and those skilled in the art may adjust the physical characteristics of the grating members 24 and 26 to effect a desired dispersion characteristic. Consequently, the dispersion equalization techniques described above with reference to FIGS. 2, 3 and 4 may be utilized in the present instance by substituting an optical grating for the correcting fibers. For example, if the technique for translating the zero dispersion wavelength of a fiber link (described with reference to FIG. 2a) is desired to be employed by using an optical grating rather than a correcting fiber, the equation for the dispersion characteristic of the optical grating in terms of its physical parameters would be substituted for equation [2]. Equation [2] as thus modified would next be substituted into equation [3]. Assuming the desired length of the compensated fiber to be equivalent to that of the main fiber having length $L_1$, equation [3] would then be solved for the physical parameter of the optical grating affecting its dispersion characteristic. A grating so designed would be operative to delay the components of optical signals at wavelengths which propagate most rapidly through the fibers 12, 14. In this manner the initial phase relationship among the differing wavelength components of signals launched on the fibers 12, 14 would be restored.

In a second alternative embodiment of the dispersion equalized fiber link of the present invention, an active device may be substituted for the correcting fibers described above in the context of the preferred embodiment. Such an active device would be positioned in series with the optical fiber for which dispersion equalization is desired. A particular example of an active device capable of providing a suitable negatively-sloped dispersion characteristic includes a channel waveguide having a negative waveguide or material chromatic dispersion. The degree of dispersion compensation is adjusted by controlling the optical path of the signal propagating in the device via an electronically-controlled switch coupled to the channel waveguide.

Thus the present invention has been described with reference to a particular embodiment in connection with a particular application. Those having ordinary skill in the art and access to the teachings of the present invention will recognize additional modifications and applications within the scope thereof. For example, the teachings of the present invention are not limited to a particular species of optical fiber, and may be applied to other types of optical signal transmission media having ascertainable dispersion characteristics. It is therefore contemplated by the appended claims to cover any and all such modifications.

Accordingly,

What is claimed is:

1. A technique for synthesizing an optical fiber of length L which induces substantially zero dispersion at a wavelength $W'$ included between first and second wavelengths W1 and W2, said fiber including first and second segments of variable lengths $L_1$ and $L_2$ having substantially zero dispersion at the wavelengths W1 and W2 and first-order dispersion characteristics $D_1$ and $D_2$ as functions of wavelength W, where $$D_1 = M_1(W' - W1)L_1, \text{ and}$$

$$D_2 = M_2(W' - W2)L_2,$$

wherein $M_1$ and $M_2$ are positive constants, comprising the steps of:

a) adjusting the length $L_1$ of the first segment such that $$L_1 = \frac{L(2M_2(W2 - W'))}{2(M_2 - M_1)W1 - (M_1 - M_2)(W2 - W'1)}$$

and b) adjusting the length $L_2$ of the second segment such that $L_2 = L - L_1$.

2. A technique for synthesizing an optical fiber of length L having a dispersion characteristic substantially equal to zero over a spectrum of wavelengths, said fiber including first and second segments of variable lengths $L_1$ and $L_2$ wherein said first segment has a zero dispersion wavelength of W1 and a positively sloped first order dispersion characteristic $D_1$, and said second segment has a zero dispersion wavelength W1 and a negatively sloped dispersion characteristic $D_2$, as functions of wavelength W, where $$D_1 = M_1(W' - W1)L_1, \text{ and}$$

$$D_2 = -M_2(W' - W1)L_2$$

over said wavelength spectrum and wherein $M_1$ and $M_2$ are positive constants, comprising the steps of:

a) adjusting the length $L_1$ of the first segment such that $L_1 = L(M_2/M_1)/(1 - M_2/M_1)$ and b) adjusting the length $L_2$ of the second segment such that $L_2 = L - L_1$.

3. A technique for synthesizing an optical fiber of length L having a dispersion characteristic substantially equal to zero over a spectrum of wavelengths, said fiber including first, second and third segments of variable lengths $L_1$, $L_2$, and $L_3$ such that $L = L_1 - L_2 - L_3$ wherein said first and second segments have zero dispersion wavelengths of W1, W2 and positively sloped first order dispersion characteristics $D_1$, $D_2$ and said third segment has zero dispersion wavelength W3 and negatively sloped first order dispersion characteristic $D_3$, as functions of wavelength W, where W2 > W3 > W1 and $$D_1 = M_1(W' - W1)L_1,$$

$$D_2 = M_2(W' - W2)L_2, \text{ and}$$

$$D_3 = -M_3(W' - W3)L_3$$

over said wavelength spectrum and wherein $M_1$, $M_2$ and $M_3$ are positive constants, comprising the steps of:

a) adjusting the length $L_1$ of the first segment such that $L_1 = (L/D)(M_2M_3(W2 - W3)$, where $D = M_1M_2(W2 - W1) + M_1M_3(W3 - W1) - M_2M_3 \cdot (W2 - W3)$;

b) adjusting the length $L_2$ of the second segment such that $L_2 = (L/D)(M_1M_3(W3 - W1)$ where $D = M_1M_2(W2 - W1) + M_1M_3(W3 - W1) - M_2M_3(W2 - W3)$; and c) adjusting the length $L_3$ of the third segment such that $L_3 = (L/D)(M_1M_2(W2 - W1)$, where $$D = M_1M_2(W2-W1)+M_1M_3(W3-W1)+M_2M_3(W2-W3).$$

4. An optical fiber of length L inducing substantially zero dispersion at a wavelength W' included between first and second wavelengths W1 and W2, comprising first and second optical fiber segments of lengths $L_1$ and $L_2$ having substantially zero dispersion at the wavelengths W1 and W2, and having first order dispersion characteristics $D_1 = M_1(W-W1)L_1$ and $D_2 = M_2(W-W2)L_2$ wherein $M_1$ and $M_2$ are positive constants and wherein the lengths $L_1$ and $L_2$ substantially satisfy the relationships:

$$L_1 = \frac{L(2M_2(W'-W'))}{2(M_2-M_1)W1 - (M_1-M_2)(W2-W1)}$$

and $$L_2 = L - L_1.$$

5. An optical fiber of length L having a dispersion characteristic substantially equal to zero over a spectrum of wavelengths, comprising first and second optical fiber segments of lengths $L_1$ and $L_2$ with each segment having a zero dispersion wavelength of W1 and respective first order dispersion characteristics $$D_1 = M_1(W-W1)L_1, \text{ and}$$

$$D_2 = -M_2(W-W1)L_2$$

over said wavelength spectrum, wherein $M_1$ and $M_2$ are positive constants and wherein $L_1 = L(M_2/M_1)/(1+M_2/M_1)$ and $L_2 = L - L_1$.

6. An optical fiber of length L having a dispersion characteristic substantially equal to zero over a spectrum of wavelengths, said fiber comprising first, second and third optical fiber segments having lengths $L_1$, $L_2$ and $L_3$, zero dispersion wavelengths W1, W2 and W3, where $W2 > W3 > W1$, and respective first order dispersion characteristics $$D_1 = M_1(W-W1)L_1,$$

$$D_2 = M_2(W-W2)L_2, \text{ and}$$

$$D_3 = -M_3(W-W3)L_3$$

over the first wavelength spectrum, wherein $M_1$, $M_2$ and $M_3$ are positive constants and wherein $$L_1 = (L/D)(M_2M_3(W2-W3)),$$

$$L_2 = (L/D)(M_1M_3(W3-W1)), \text{ and}$$

$$L_3 = (L/D)(M_1M_2(W2-W1)),$$

with
$$D = M_1M_2(W2-W1)+M_1M_3(W3-W1)-M_2M_3(W2-W3).$$

* * * * *